United States Patent [19]

Villata

[11] Patent Number: 4,581,985

[45] Date of Patent: Apr. 15, 1986

[54] HYDRAULICALLY ACTUATED BRAKE INCORPORATING A DEVICE TO PREVENT AN EXCESSIVE RISE IN THE TEMPERATURE OF THE HYDRAULIC FLUID

[75] Inventor: Gino Villata, Buttigliera d'Asti, Italy

[73] Assignee: Valeo, Paris, France

[21] Appl. No.: 473,612

[22] Filed: Mar. 8, 1983

[30] Foreign Application Priority Data

Mar. 12, 1982 [FR] France ................................. 82 04237

[51] Int. Cl.[4] ................................................ F16J 9/00
[52] U.S. Cl. ...................................... 92/248; 188/72.4; 188/264 G
[58] Field of Search ....................... 92/1, 129, 212, 213, 92/215, 216, 220, 248, 255, 176, 249, 254, 214, 228, 229, 222, 260; 188/264 G, 72.4, 72.5, 370; 165/135, 136; 123/193 P

[56] References Cited

U.S. PATENT DOCUMENTS

| | | | |
|---|---|---|---|
| 2,801,714 | 8/1957 | Dotto | 188/264 G |
| 3,010,543 | 11/1961 | Pear | 188/264 G |
| 3,274,904 | 10/1964 | Jacoby . | |
| 3,375,972 | 4/1968 | Raufeisen | 92/212 |
| 3,722,634 | 3/1973 | Ogasawara et al. | 92/129 |
| 3,730,302 | 5/1973 | Ogawa et al. | 188/73.5 |
| 4,433,757 | 2/1984 | Warwick et al. | 188/72.4 |

FOREIGN PATENT DOCUMENTS

| | | | |
|---|---|---|---|
| 2722194 | 11/1978 | Fed. Rep. of Germany ... | 188/264 G |
| 2854247 | 6/1980 | Fed. Rep. of Germany ... | 188/264 G |
| 2280832 | 2/1976 | France . | |
| 46-17846 | of 1971 | Japan | 188/72.4 |
| 124735 | 9/1981 | Japan | 92/248 |
| 5591726 | of 1982 | Japan | 92/248 |
| 985628 | 3/1965 | United Kingdom ......... | 188/264 G |

Primary Examiner—Edward K. Look
Attorney, Agent, or Firm—Young & Thompson

[57] ABSTRACT

A hydraulically actuated brake fitted with a device to prevent an excessive rise in the temperature of the hydraulic fluid comprises an actuating piston in the form of a hollow body or cup within which is disposed an insulating core. The core has an outer face which engages the respective friction pad, and is engaged by a press fit within the cup by engagement means which leave an air gap between the core and the cup. The press fit engagement is thereby facilitated and heat transfer between the piston and the hydraulic fluid contained in the actuating chamber is reduced, thereby protecting the hydraulic fluid from an excessive rise in temperature during braking.

11 Claims, 17 Drawing Figures

HYDRAULICALLY ACTUATED BRAKE INCORPORATING A DEVICE TO PREVENT AN EXCESSIVE RISE IN THE TEMPERATURE OF THE HYDRAULIC FLUID

BACKGROUND OF THE INVENTION

This invention relates to a hydraulically actuated brake comprising at least one friction element, for example a brake pad in the case of a disc brake, adapted to be clamped against a rotating track by a piston fitted slidably in a cylindrical body in response to a build-up of pressure in an actuating chamber containing hydraulic fluid and defined in part by the said piston.

The invention relates particularly to such a brake in which the piston comprises a cup-shaped element having a cylindrical wall sliding in the cylinder and a base adjacent the actuating chamber.

The cup forming the piston is usually made from metal for example, steel, and is applied directly to the friction element. During braking, the heat generated by the friction between the friction element and the rotating track causes a rise in the temperature of the metal piston and consequently of the hydraulic fluid which is contained in the actuating chamber and in contact with the base of the cup. There is a danger that the hydraulic fluid, which generally consists of oil, may lose its operating efficiency when the temperature exceeds a given value, for example 150° C. It is therefore important that the heat generated by friction should not cause the temperature of the hydraulic fluid to rise above such a value.

The invention relates particularly to such a brake in which means are provided to prevent an excessive rise in the temperature of the hydraulic fluid consisting of a cylindrical core of mechanically strong and thermally insulating material fitted inside the cup forming the piston, the walls of the core and of the cup being fixed together by connecting means having a press fit.

The side walls of the core and of the cup are generally continuous, which permits a direct and effective press fit, but only under assembly conditions which necessitate high precision and which are in any case difficult because of the large surface areas present. Moreover, the core frequently forms an insufficient heat shield to prevent the temperature of the hydraulic fluid from rising to an excessive value.

The object of the invention is a hydraulically actuated brake of the kind described above, in which the hydraulic fluid of the actuating chamber is protected in a particularly effective manner from an excessive rise in temperature, and the assembly conditions for the press fit of the core in the cup are improved.

SUMMARY

According to the invention, a hydraulically actuated brake of the kind described above is characterised in that the press fit connecting means of the core in the cup are localised and involve only a part of the side walls of the core and of the cup, and provide an interstice between the remaining part of these side walls which mutually separates them.

By virtue of this arrangement, the air gap left by interstices between the cup and the core considerably improves the efficiency of the thermal insulation between the friction element which engages the rotating track, and the cup-shaped piston which is in contact with the hydraulic fluid. Thus the hydraulic fluid is protected from an excessive temperature rise and is not in danger of losing its operational qualities. Furthermore, due to the above-stated localisation, engagement of the core as a press fit inside the cup is made particularly easy, both when the press fit connecting means consist of the actual side walls of the core and of the cup, and also when they consist of one or more separately-inserted elements interposed between these side walls.

According to a feature of the invention, the press fit connecting means consist of localised regions of the actual side walls of the core and of the cup.

These localised regions are formed by protuberances of the core or of the cup and are engaged with the regular surface of the other element, or preferably in recesses made in this other element.

The localised regions are at least partly linear and extend, for example, along generatrices of the cup, particularly over a part of the height of the cup preferably close to its base. These localised linear regions may likewise be annular or, generally speaking, have any appropriate arrangement. The localised regions may likewise be at least partly punctual.

As a variant, the localised regions consist of a projecting helicoidal thread made in the side wall of the cup and slightly embedded in the side wall of the core. In this case the press fit engagement is performed not by an axial action but by a screwing action.

According to another feature of the invention, the press fit connecting means of the core in the cup consist of one or more separate elements interposed between the side walls of the core and of the cup.

These interposed elements may be engaged directly between the ordinary surfaces of the core and of the cup, or in recesses of the core and/or of the cup.

In one embodiment, the interposed elements comprise lugs extending along generatrices and equipped with hooking noses. Such lugs may be separate or joined into a single piece by a stellate base placed on the base of the cup.

In another variant, the construction of which is particularly simple and effective, the interposed element consists of a slit, externally toothed elastic washer engaged in an annular groove of the core, this groove exhibiting a tapered flank to give the washer, upon the engagement of the core in the cup, an inclination which permits such an engagement but which, when once the core has reached the base of the cup, fixes these two pieces together by buttress effect of the booth system of the washer against the cup.

Preferably, whatever the form of the connecting means between the core and cup, the core overlaps the cup so the external face by which the piston is made to engage the friction element is defined by the core of the exclusion of the cup.

In an embodiment, the core is of friction lining material containing fibres, fillers and a binder.

DETAILED DESCRIPTION OF THE PREFERRED EMBODIMENTS

Reference is made at first to FIGS. 1 to 5 which relate, by way of a non-limiting example, to the application of the invention to a hydraulically actuated disc brake, particularly for a motor vehicle.

Figure 1:
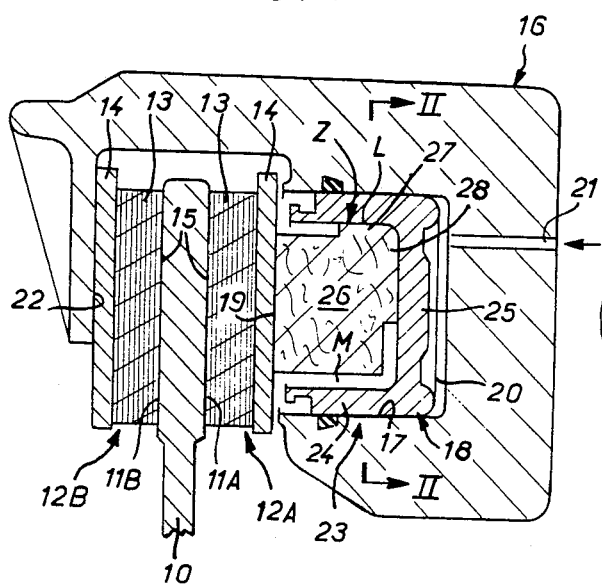
FIG. 1 is a general schematic view in section of a brake according to the invention, the piston of which comprises a cup receiving a core of mechanically strong and thermally insulating material.
Figure 2:
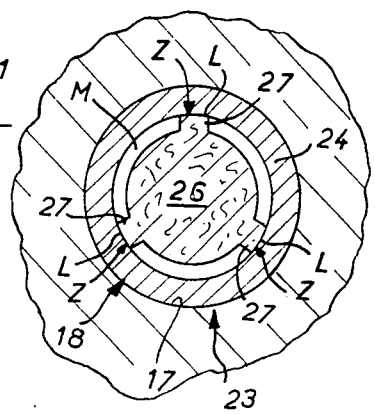
FIG. 2 is a view of this piston in cross-section along the line II—II of FIG. 1.
Figure 3:
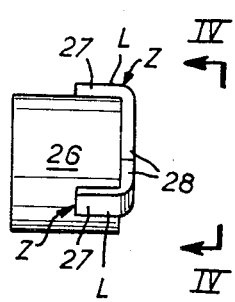
FIG. 3 is a view in side elevation of the core.
Figure 4:
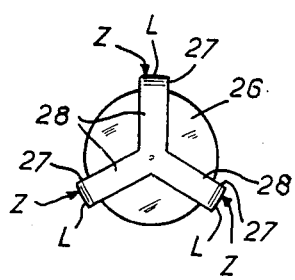
FIG. 4 is an end view of this core according to the arrow IV—IV of FIG. 3.
Figure 5:
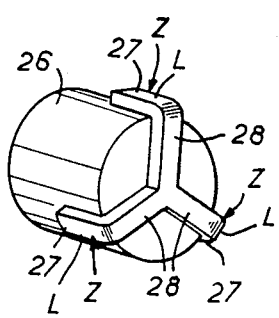
FIG. 5 is a view in perspective of the core.

FIG. 1 shows, at 10, the brake disc which has two opposite friction tracks 11A and 11B adapted to frictionally engage two friction elements comprising brake pads 12A and 12B. Each pad 12A, 12B consists of a friction lining material 13 fixed to a support 14. Each pad 12A, 12B is adapted to engage the corresponding friction track 11A, 11B of the disc 10 by the free surface 15 of the lining 13 which is opposite the support 14. It is thus the support 14 which transmits the force to each pad 12A, 12B to clamp it against the disc 10.

The brake comprises a caliper 16 which is disposed over the disc 10 and in which the brake pads 12A and 12B are fitted. The caliper 16 forms the body of a cylinder 17 in which a piston, generally designated 18, is slidably fitted.

The piston 18 comprises an outer face 19 by which it is made to engage the support 14 of the strip 12A. The piston 18 defines, in the cylinder 17, an actuating chamber 20 which is filled with hydraulic fluid, for example oil. Pressurised hydraulic fluid can be admitted to the chamber 20 through a channel, shown at 21, which communicates with the chamber 20.

The caliper 16 likewise comprises a reaction face 22 against which the support 14 of the other brake pad 12B comes to bear.

The pads 12A and 12B are thus adapted to be clamped against the rotating tracks 11A and 11B of the disc 10 by the action of the piston 18 sliding in the cylinder 17, in response to a build-up of pressure in the actuating chamber 20.

The piston 18 (FIGS. 1 to 5) comprises a cup-shaped element or hollow body 23 having a cylindrical side wall 24 engaged within the cylinder 17 and a base 25 adjacent the actuating chamber 20. In the example shown in FIG. 1, the cup 23 is cast from steel. The piston 18 also comprises a cylindrical core 26 of thermally insulating and mechanically strong material. The core 26 is housed in the cup 23 and extends beyond the latter. The outer face 19, by which the piston 18 engages the pad 12A, is thus defined by the insulating core 26 and not the cup 23.

The thermally insulating and mechanically strong material of which the core 26 is made is a brake friction lining material containing fibres, fillers and a binder. This material may contain, for example, a percentage by weight of 30% glass or asbestos fibres, 50% mineral filler such as calcium carbonate, and 20% of a binder such as phenolic resin.

The side walls of the core 26 and of the cup 23 are mutually engaged by press fit connecting means L which are localised and which involve only a part of the side walls of the core 26 and of the cup 23, forming in the remaining part of these side walls an interstice M filled with air which mutually separates them.

In the example shown in FIGS. 1 to 5, the press fit connecting means L consist of localised regions Z of the actual side walls of the core 26 and of the cup 23.

These localised regions Z are formed by protuberances 27 on the core 26. Particularly, the localised zones Z are at least partly linear. The localised linear zones Z formed by the protuberances 27 extend along generatrices of the cup 23 over a part of the height of the side wall 24 of the cup 23 which is near the base 25 of the cup 23. The lower face of the core 26 likewise has protuberances 28 which are linear and radial.

It will be appreciated that the conditions of assembly of the core 26 in the cup 23 by a press fit are particularly easy since the side surface of contact between the core 26 and the cup 23 is divided into the localised regions Z.

The localised regions Z likewise have the effect of improving the thermal insulation between the friction elements 12A and the fluid in the hydraulic chamber 20.

During braking a pressure is admitted through the pipe 21 into the actuating chamber 20, which pushes the piston 18 against the pad 12A and produces clamping of the disc 10 between the pads 12A and 12B. The heat developed by this frictional engagement is transmitted only minimally to the base 25 of the cup 23, by virtue of the insulating core 26 which forms a heat shield; the efficiency of this shield is improved due to the air gaps such as M which are formed in the cup 23 by the core 26 between the protuberances 27 and 28. Thus the hydraulic fluid in the chamber 20 is protected from an excessive rise in temperature, which might cause it to lose its qualities and its operational efficiency.

As a variant (FIG. 6) the arrangement is similar to that which has just been described with reference to FIGS. 1 to 5, but the protuberances 27 on the core 26 are engaged in recesses 29 in the cup 23. Thus the conditions of press fit engagement of the core 26 in the cup 23 are made still more precise and easy.

In another variant (FIG. 7) the localised regions Z are formed by protuberances 30 on the cup 23. These protuberances 30 are advantageously engaged in recesses 31 in the core 26.

Figure 8:
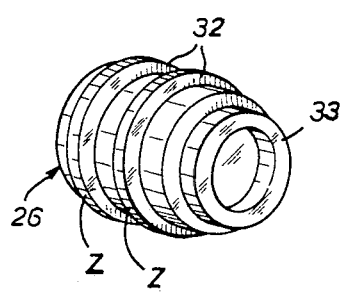
FIG. 8 relates to another variant in which the protuberances of the core are annular.

In another variant (FIG. 8) the localised linear regions Z are formed respectively by annular flanges 32 on the core 26 coaxial with the piston 18, and the lower face of the core comprises an annular flange 33.

Figure 9:
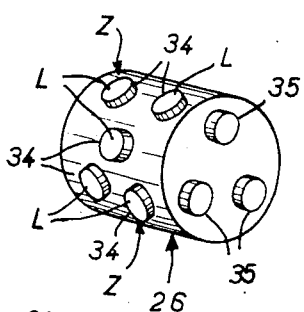
FIG. 9 relates to another variant in whch the protuberances of the core are punctual.

In another variant (FIG. 9) the localised regions Z are at least partly punctual and formed particularly by projecting studs 34, and the lower face of the core likewise comprises projecting studs 35.

Figure 10:
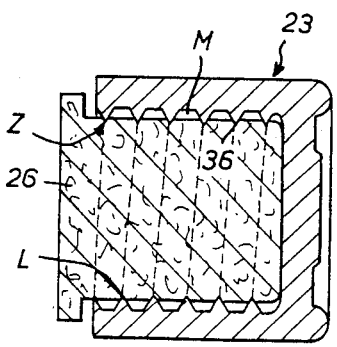
FIG. 10 relates to another variant in which the core is slightly embedded by screw engagement in a projecting helicoidal thread of the side wall of the cup.

In another variant (FIG. 10) the localised regions Z consist of a projecting helicoidal thread 36 formed in the side wall of the cup 23 and slightly embedded in the side wall of the core 26. In this case the press fit engagement is effected by a screwing action. The air gap M is disposed between the turns of the thread 36.

In the embodiments so far described, the connecting means L consist of localised regions Z of the actual walls of the core 26 and of the cup 23.

In the embodiments which will now be described, the connecting means L consist of one or more separate elements C interposed between the core 26 and the cup 23.

Figure 6:
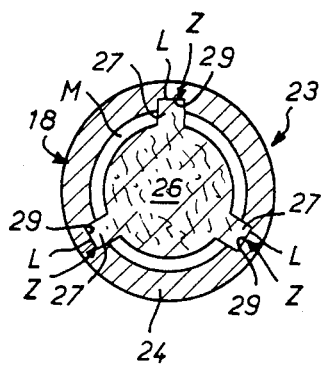
FIG. 6 is a similar view to FIG. 2, but relates to a variant in which the protuberances of the core are engaged in recesses of the cup.
Figure 7:
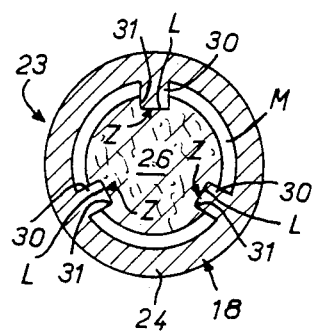
FIG. 7 is a similar view to FIG. 6, but relates to another variant in which the protuberances are provided on the cup and are engaged in recesses of the core.
Figure 11:
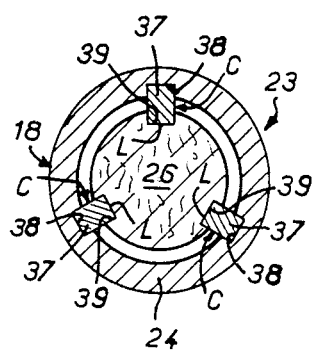
FIG. 11 is a similar view to FIG. 6 or FIG. 7, but relates to another variant in which shims are inserted between the core and the cup and are engaged in recesses of the core and of the cup.

Referring to FIG. 11, the arrangement here is similar to that of FIG. 6 or that of FIG. 7, and the elements C consist of shims 37 arranged along generatrices and inserted between the core 26 and the cup 23. These shims 37 are advantageously engaged in recesses 38 in the cup 23 and/or in recesses 39 of the core 26.

In another variant (FIGS. 12 and 13) the elements C comprise lugs 40 which extend along generatrices and which are equipped with hooking noses 41. These lugs 40 are joined by a stellate base 42 to form a single, generally tripod-shaped piece.

Figure 12:
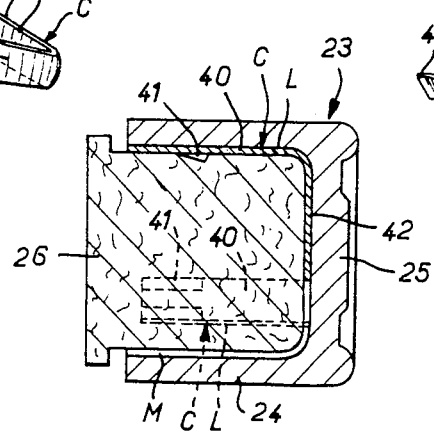
FIG. 12 relates to another variant in which an interposed element in the form of a tripod is disposed between the core and the cup.

In the assembly position of FIG. 12, the lugs 40 are inserted between the side walls of the core 26 and of the cup 23 with a hooking effect by noses 41, and the base 42 is inserted between the lower wall of the core 26 and the base of the cup 23. As previously, air gaps are then formed between the lugs 40.

The assembly is performed easily by a press fit effect.

Figure 13:
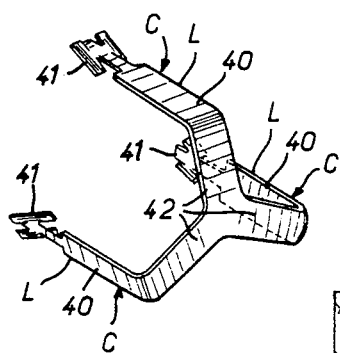
FIG. 13 shows this tripod in perspective.
Figure 14:
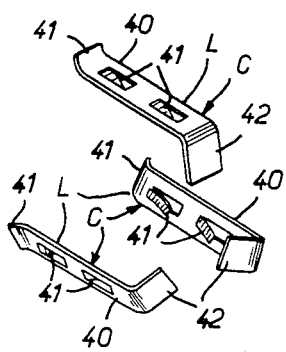
FIG. 14 is a similar view to FIG. 13, but in which the tripod is replaced by three distinct lugs.

In another variant (FIG. 14) the arrangement is similar to that which has just been described with reference to FIGS. 12 and 13, but the lugs 40 are formed by separate pieces.

Figure 16:
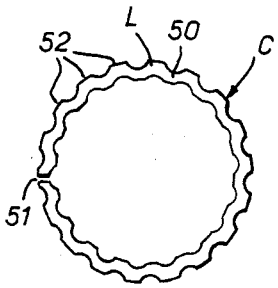
FIG. 16 shows this washer in elevation.
Figure 15:
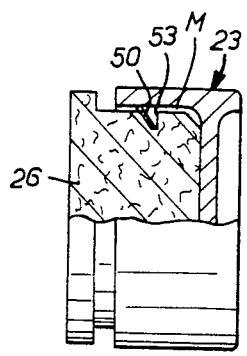
FIG. 15 relates to yet another variant, in which an interposed element in the form of a slit, toothed elastic washer is inserted between the core and the cup.
Figure 17:
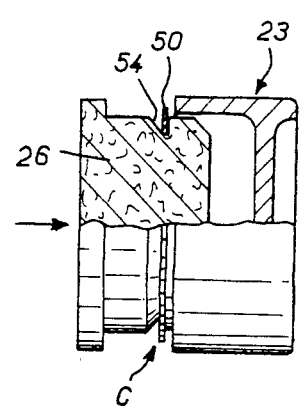
FIG. 17 is a similar view to FIG. 15 but during the assembly of the core in the cup.

In another variant (FIGS. 15 to 17), the construction of which is particularly simple and effective, the element C consists of an elastic washer 50 slit at 51 and externally toothed at 52 (FIG. 16). The washer 50 is adapted to be engaged in an annular groove 53 in the core 26.

The groove 53 is formed with a tapered flank 54 in order to give the washer 50, when the core 26 is engaged (FIG. 17) in the cup 23, an inclination (FIG. 16) which permits engagement but which, when once the core 26 has reached the base of the cup 23, joins these two pieces together by a jamming effect of the toothed washer 50 against the cup 23. As previously, an air gap M is formed between the side walls of the core 26 and of the cup 23.

I claim:

1. A hydraulically actuated brake, comprising at least one friction element adapted to be clamped against a rotatable friction track by a piston fitted slidably in a cylinder body in response to an increase in pressure in an actuating chamber containing hydraulic fluid and defined in part by said piston, wherein the piston comprises a cup-shaped member having a cylindrical side wall engaged within the cylinder, and a base adjacent said actuating chamber, and a cylindrical core of mechanically strong and thermally insulating material engaged within the cup-shaped member, the side walls of said core and of said cup being fixed together by press-fit connecting means, and wherein said connecting means are localised and extend over only a minor part of the area of the side walls of said core and said cup, forming between the remaining part of these side walls an interstice which mutually separates them, said press-fit connecting means comprising protrusions that extend between said core and said cylindrical side wall of said cup-shaped member, said protrusions being elongated in a direction parallel to the axis of the cylindrical core and being spaced apart by spaces that have a substantially greater peripheral extent than the width of the protrusions.

2. A brake according to claim 1, wherein said protrusions are formed by protruberances on the core.

3. A brake according to claim 2, wherein the protuberances on the core are engaged in recesses in the cup.

4. A brake according to claim 1, wherein said protuberances are formed on the cup.

5. A brake according to claim 4, wherein said protuberances on the cup are engaged in recesses in the core.

6. A brake according to claim 1, wherein said protrusions extend from the base of the core over only part of the height of the side wall of the core.

7. A brake according to claim 1, in which said protrusions comprise separate members interposed between the side walls of the core and of the cup.

8. A brake according to claim 1, wherein said protrusions comprise shims engaged in recesses in the cup.

9. A brake according to claim 1, wherein said protrusions comprise shims disposed in recesses in the core.

10. A brake according to claim 1, wherein said protrusions are joined into a single piece by a stellate base.

11. A brake according to claim 1, wherein the core is made of a friction lining material containing fibers, fillers and a binder.

* * * * *